(12) United States Patent
Paolella et al.

(10) Patent No.: US 10,181,621 B2
(45) Date of Patent: Jan. 15, 2019

(54) ELECTRODE FOR PHOTOBATTERY

(71) Applicant: HYDRO-QUÉBEC, Montreal, Quebec (CA)

(72) Inventors: Andrea Paolella, Montreal (CA); Cyril Faure, Longueuil (CA); Abdelbast Guerfi, Brossard (CA); Pierre Hovington, Boucherville (CA); Karim Zaghib, Longueuil (CA)

(73) Assignee: HYDRO-QUEBEC, Montreal QC (CA)

( * ) Notice: Subject to any disclaimer, the term of this patent is extended or adjusted under 35 U.S.C. 154(b) by 0 days.

(21) Appl. No.: 15/312,904

(22) PCT Filed: May 20, 2015

(86) PCT No.: PCT/CA2015/050457
§ 371 (c)(1),
(2) Date: Nov. 21, 2016

(87) PCT Pub. No.: WO2015/176185
PCT Pub. Date: Nov. 26, 2015

(65) Prior Publication Data
US 2017/0110767 A1  Apr. 20, 2017

Related U.S. Application Data

(60) Provisional application No. 62/000,809, filed on May 20, 2014.

(51) Int. Cl.
*H01G 9/20* (2006.01)
*H01M 10/0525* (2010.01)
(Continued)

(52) U.S. Cl.
CPC .......... *H01M 10/465* (2013.01); *H01G 9/204* (2013.01); *H01G 9/2031* (2013.01);
(Continued)

(58) Field of Classification Search
CPC ............ H01M 10/465; H01M 14/005; H01M 10/0525; H01M 4/382; H01G 9/2031; H01G 9/204
See application file for complete search history.

(56) References Cited

U.S. PATENT DOCUMENTS

2007/0092793 A1  4/2007  Song et al.
2010/0307577 A1  12/2010  Chen et al.
(Continued)

FOREIGN PATENT DOCUMENTS

CN  201038243 Y  3/2008
CN  102099947 A  6/2011
(Continued)

OTHER PUBLICATIONS

*International Search Report (PCT/ISA/210) dated Aug. 10, 2015, by the Canada Patent Office as the International Searching Authority for International Application No. PCT/CA2015/050457.
(Continued)

*Primary Examiner* — Stewart A Fraser
(74) *Attorney, Agent, or Firm* — Buchanan Ingersoll & Rooney P.C.

(57) ABSTRACT

An electrode including an electrode material of the same type as electrode materials used in Li-ion batteries and a dye is provided. The electrode may further include a semiconductor material. The electrode is used in the manufacture of a battery that is rechargeable using light. Method of manufacturing an electrode, including the following steps: (a) preparing a film including an electrode material of the same type as electrode materials used in Li-ion batteries; and (b) bringing into contact the film and a solution including a photosensitive dye.

23 Claims, 22 Drawing Sheets

(51) Int. Cl.
- *H01M 4/38* (2006.01)
- *H01M 10/46* (2006.01)
- *H01M 4/58* (2010.01)
- *H01M 4/587* (2010.01)
- *H01M 14/00* (2006.01)
- *H01M 4/485* (2010.01)
- *H01M 4/525* (2010.01)
- *H01M 4/02* (2006.01)

(52) U.S. Cl.
CPC .......... *H01G 9/2059* (2013.01); *H01M 4/382* (2013.01); *H01M 4/587* (2013.01); *H01M 4/5825* (2013.01); *H01M 10/0525* (2013.01); *H01M 14/005* (2013.01); *H01M 4/386* (2013.01); *H01M 4/485* (2013.01); *H01M 4/525* (2013.01); *H01M 4/5815* (2013.01); *H01M 2004/021* (2013.01); *Y02E 10/542* (2013.01)

(56) References Cited

U.S. PATENT DOCUMENTS

| | | | |
|---|---|---|---|
| 2011/0086246 A1* | 4/2011 | Furukawa | H01L 31/18 429/7 |
| 2011/0100532 A1 | 5/2011 | Lee et al. | |
| 2011/0171531 A1* | 7/2011 | Hersam | B82Y 30/00 429/231.8 |
| 2012/0085411 A1 | 4/2012 | Isobe et al. | |
| 2013/0089789 A1* | 4/2013 | Furuya | C23C 14/0676 429/231.1 |
| 2013/0147420 A1 | 6/2013 | Wei et al. | |
| 2014/0060641 A1* | 3/2014 | Nazeeruddin | C07D 401/14 136/256 |
| 2014/0087257 A1 | 3/2014 | Gopukumar et al. | |
| 2015/0144196 A1* | 5/2015 | Irwin | H01G 9/2027 136/261 |

FOREIGN PATENT DOCUMENTS

| | | |
|---|---|---|
| EP | 2 296 208 A1 | 3/2011 |
| EP | 3 075 024 A1 | 10/2016 |
| KR | 20130089386 A | 8/2013 |
| KR | 101338957 B1 | 12/2013 |
| WO | 2015/079170 A1 | 6/2015 |

OTHER PUBLICATIONS

*Written Opinion (PCT/ISA/237) dated Aug. 10, 2015, by the Canada Patent Office as the International Searching Authority for International Application No. PCT/CA2015/050457.

O'Regan et al., "A low-cost, high-efficiency solar cell based on dye-sensitized colloidal TiO2 films," Nature, (Oct. 24, 1991), vol. 353, pp. 737-740.

The extended European Search Report dated Dec. 4, 2017, by the European Patent Office in corresponding European Patent Application No. 15796685.4-1360. (9 pages).

Office Action (Notification of the First Office Action) dated Jan. 2, 2018, by the State Intellectual Property Office (SIPO) of the People's Republic of China in corresponding Chinese Patent Application No. 201580037602.7 and an English Translation of the Office Action. (29 pages).

Office Action (Notification of the Second Office Action) dated Sep. 14, 2018, by the State Intellectual Property Office of the People's Republic of China in corresponding Chinese Patent Application No. 201580037602.7, and an English Translation of the Office Action. (19 pages).

* cited by examiner

ELECTRODE FOR PHOTOBATTERY

FIELD OF THE INVENTION

The invention relates generally to electrodes. More specifically, the invention relates to an electrode comprising, in combination, an electrode material of the same type as electrode materials used in Li-ion batteries and a light sensitive dye of the same type as light sensitive dyes used in dye-sensitized solar cells (DSSC). A battery comprising an electrode according to the invention may be charged using light.

BACKGROUND OF THE INVENTION

A lithium-ion battery may be summarily defined as follows: the battery comprises a cathode material (for example $LiFePO_4$, $LiCoO_2$, $FeS_2$, $V_2O_5$, etc.), a lithium salt (for example $LiPF_6$, LiTFSI, $LiClO_4$, LMO, $Li_2CO_3$, etc.) dissolved in a liquid solvent or a polymer, and an anode material (for example graphite, LTO, etc.). In cases where the anode and/or cathode materials are not good current conductor, the material can be coated with carbon and/or be deposited on metallic substrates (for example aluminum, copper, etc.).

FIG. 1 outlines the operation of a lithium-ion battery. Reference numeral 10 depicts the copper cathode current collector, reference numeral 11 depicts the lithium ions conductive electrolyte, and reference numeral 12 depicts the aluminum anode current collector. During operation of the battery, oxidation of the anode material leads to de-intercalation of lithium ions, and simultaneously the cathode material undergoes a reduction reaction leading to intercalation of the lithium ions into its structure. Thereafter, the battery may be charged by application of an external current. The external circuit creates movement of the electrons from the cathode (which is in a reduced state) towards the anode. This leads to oxidation of the cathode material and thus de-lithiation restoring the lithium in the anode material. Following this process, the battery may be charged and discharged in a thousand cycles.

A dye-sensitized solar cell (DSSC) may be summarily defined as follows: the system requires that at least one of its faces comprise a current collector which is transparent to light (FIG. 2, arrow 1'). The transparent current collector can be a metallic grid or a very thin layer of a metal, a conductive polymer or a transparent substrate (glass or polymer) coated with a layer of a material which is transparent and conductive such as an oxide (for example FTO, ITO, Al-doped ZnO, Ga and/or Si, etc.), a conductive polymer (for example PEDOT:PSS, etc.) or metallic grids.

The photosensitive layer in a DSSC (FIG. 2, arrow 2') comprises a layer of a semiconductive material (for example $TiO_2$, ZnO, $SnO_2$, "core-shell", etc.). The layer must be as much transparent as possible and must enable the adsorption of the photosensitive dye. Typically, the photosensitive dye comprises organometallic molecules. This includes dyes wherein molecules have pyridyl groups and ruthenium (for example industrial dyes known as "N3", "black dye", "SJW-E1", "N719", etc.). The photosensitive dye may also comprise organic molecules only (for example "TA-St-CA", etc.).

The electrolyte in a DSSC (FIG. 2, arrow 3') may be a liquid, a gel or a solid. In any case, the electrolyte must comprise a sacrificial redox couple. Typically, the sacrificial redox couple is $I_3^-/I^-$. However, other redox couples may also be used (for example $Br_3^-/Br$, $SeCN^-/(SeCN)_2$, $(SCN)_2/SCN^-$, $Co^{3+}/Co^{2+}$, etc.). A catalyst (for example platinum, gold etc.) is generally used (FIG. 2, arrow 4') in order to increase the recombination speed of the sacrificial couple.

Finally, a DSSC generally comprises a current collector (FIG. 2, arrow 5'). The current collector may be transparent such as the one illustrated in Scheme, arrow 1', or non-transparent.

FIG. 3 succinctly outlines the operation of a DSSC. Reference numeral 13 depicts a semiconductor, reference numeral 14 depicts a dye, reference numeral 15 depicts the electrolyte, reference numeral 16 depicts a counter-electrode made of conductive glass, and reference numeral 17 depicts the external circuit.

In a DSSC, the flux of electrons is created by the excitation of the photosensitive dye. Excitation is effected by light and by the fact that the lowest unoccupied molecular orbital (LUMO) of the dye has an energy level higher than the energy level of the conduction band of the semiconductor. Accordingly, electrons may be captured by the semiconductor and then the current collector when they leave the excited dye (S*). The dye is oxidized into $S^+$ and immediately reacts with the sacrificial redox couple $R/R^-$ according to the reaction $S^+ + R^- \rightarrow S + R$. Finally, the electron arriving at the counter-electrode through the external circuit serves in the recombination of the sacrificial redox couple. Given that the reactions occurring are governed by kinetics, electron extraction from the excited dye via the semiconductor then the current collector must be faster than the natural relaxation of the dye, in order to obtain this reaction mechanism.

Extensive research aimed at improving the quality of batteries is being conducted. A large part of this work relates to electrodes.

SUMMARY OF THE INVENTION

The inventors have designed and built an electrode which, when used in a battery, allows for the battery to be charged using light. The electrode according to the invention comprises, in combination, an electrode material of the same type as electrode materials used in Li-ion batteries and a photosensitive dye of the same type as photosensitive dyes used in dye-sensitized solar cells (DSSC). In an embodiment of the invention, the electrode may further comprise a semiconductor material. A battery comprising the electrode according to the invention may be charged using light.

The invention thus relates to the following according to an aspect thereof:

(1) Electrode comprising an electrode material of the same type as electrode materials used in Li-ion batteries and a photosensitive dye.
(2) Electrode according to item (1), further comprising a semiconductor material.
(3) Electrode comprising a cathode material of the same type as cathode materials used in Li-ion batteries and a photosensitive dye.
(4) Electrode according to item (3), further comprising a semiconductor material.
(5) Electrode comprising an anode material of the same type as anode materials used in Li-ion batteries and a photosensitive dye.
(6) Electrode according to item (5), further comprising a semiconductor material.
(7) Electrode according to item (3) or (4), wherein the cathode material is an olivine type material.

(8) Electrode according to item (3) or (4), wherein the cathode material is $LiFePO_4$, $LiCoO_2$, $FeS_2$ or $V_2O_5$; preferably the cathode material is $LiFePO_4$.
(9) Electrode according to item (5) or (6), wherein the anode material is metallic lithium, graphite, silicon, or a metal oxide such as $Fe_2O_3$, $TiO_2$ and $Li_4Ti_5O_{12}$; preferably the anode material is metallic lithium or graphite.
(10) Electrode according to any one of items (1) to (9), wherein the electrode material is coated with carbon.
(11) Electrode according to any one of items (1) to (9), wherein the electrode material comprises particles having a size below 1 µm; preferably the size of the particles is below 0.1 µm.
(12) Electrode according to any one of items (2), (4) and (6), wherein the semiconductor material is $TiO_2$, ZnO, $SnO_2$, a core-shell, or a combination thereof; preferably the semiconductor material is $TiO_2$.
(13) Electrode according to any one of items (2), (4) and (6), wherein the semiconductor material comprises particles having a size below 100 nm; preferably the size of the particles is below 30 nm.
(14) Electrode according to any one of items (2), (4) and (6), wherein the semiconductor material is pre-calcined.
(15) Electrode according to any one of items (1) to (9), wherein the photosensitive dye is N3, black dye, SJW-E1, N719, an organic photosensitive dye such as TA-St-CA, or a combination thereof; preferably the photosensitive dye is N719.
(16) Electrode according to any one of items (1) to (9), further comprising a solvent, a dispersant, a binder, or a combination thereof.
(17) Electrode according to item (16), wherein the solvent is N-methyl-2-pyrrolidine (NMP), water, acetone, an alcohol such as methanol, propanol and butanol, dimethylformamide (DMF), dimethyl sulfoxide (DMSO), or a combination thereof; preferably the solvent is water.
(18) Electrode according to item (16), wherein the dispersant is polyvinylidene difluoride (PVDF), a tension-active agent that does not react with electrode materials such as Triton-X100, an alkyl bromide ammonium salt such as tetraethylammonium bromide, an alkylbenzyldimethylammonium halide such as an alkylbenzyldimethylammonium bromide or halide, a glycol ester such as glycol stearate, a glycerol ester, or a combination thereof; preferably the dispersant is Triton-X100.
(19) Electrode according to item (16), wherein the binder is polyethylene glycol (PEG), polyvinylidene difluoride (PVDF), polyvinyl acetate (PVA), or a combination thereof; preferably the binder is polyethylene glycol (PEG).
(20) Electrode material comprising, in combination, an electrode material of the same type as electrode materials used in Li-ion batteries and a photosensitive dye.
(21) Electrode material according to item (20), further comprising a semiconductor material.
(22) Electrode material according to item (20) or (21), wherein the photosensitive dye is anchored to the surface of the electrode material particles.
(23) Electrode material according to item (21), wherein the photosensitive dye is anchored to the surface of the electrode material particles and the semiconductor material particles.
(24) Solid substrate having deposited thereon a material as defined in any one of items (20) to (23); preferably the solid subtract is a fluorine-doped tin oxide glass (FTO glass).
(25) Method of manufacturing an electrode, comprising a step of bringing into contact an electrode material of the same type as electrode materials used in Li-ion batteries and a photosensitive dye.
(26) Method according to item (25), wherein the electrode material is mixed with a semiconductor material prior to the contacting step.
(27) Method of manufacturing an electrode, comprising the following steps: (a) preparing a film comprising an electrode material of the same type as electrode materials used in Li-ion batteries; and (b) bringing into contact the film and a solution comprising a photosensitive dye.
(28) Method according to item (27), further comprising a preliminary step of (a1) mixing the electrode material with a semiconductor material prior to conducting step (a).
(29) Method according to item (27) or (28), wherein step (a) comprises depositing the electrode material on a solid substrate; preferably the solid substrate is a fluorine-doped tin oxide glass (FTO glass).
(30) Method according to item (27) or (28), wherein step (a) comprises depositing the mixture electrode material and semiconductor material on a solid substrate; preferably the solid substrate is a fluorine-doped tin oxide glass (FTO glass).
(31) Method according to item (29) or (30), wherein depositing of the material is carried out by the Doctor Blade method, by the immersion withdrawal or dipping withdrawing method, by a serigraphy method, by the spin-coating method, or a combination thereof; preferably depositing of the material is carried out by the Doctor Blade method or by the immersion withdrawal or dipping withdrawing method.
(32) Method according to item (27) or (28), wherein step (a) comprises using a solvent; and the method further comprises, between steps (a) and (b), a drying step followed by a cooling step.
(33) Method according to item (32), wherein the drying step is carried out at a temperature of about 400° C. and under inert atmosphere, preferably under nitrogen atmosphere; and cooling is carried out naturally until room temperature is reached.
(34) Method according to item (27) or (28), wherein step (b) comprises dipping the film into the solution comprising a photosensitive dye.
(35) Method according to item (27) or (28), further comprising a drying step after step (b) followed a cooling step.
(36) Method according to item (35), wherein the drying step is carried out at a temperature between room temperature and 120° C. and under inert atmosphere; and cooling is carried out naturally until room temperature is reached.
(37) Battery using an electrode as defined in any one of items (1) to (19).
(38) Battery according to item (37), which is rechargeable using light.
(39) Use of an electrode as defined in any one of items (1) to (19), in the manufacture of a battery.
(40) Use of a material as defined in any one of items (20) to (23), in the manufacture of a battery.
(41) Use of a solid substrate as defined in item (24), in the manufacture of a battery.
(42) Battery manufactured subsequent to a use as defined in any one of items (39) to (41), which is rechargeable using light.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

Figure 1:
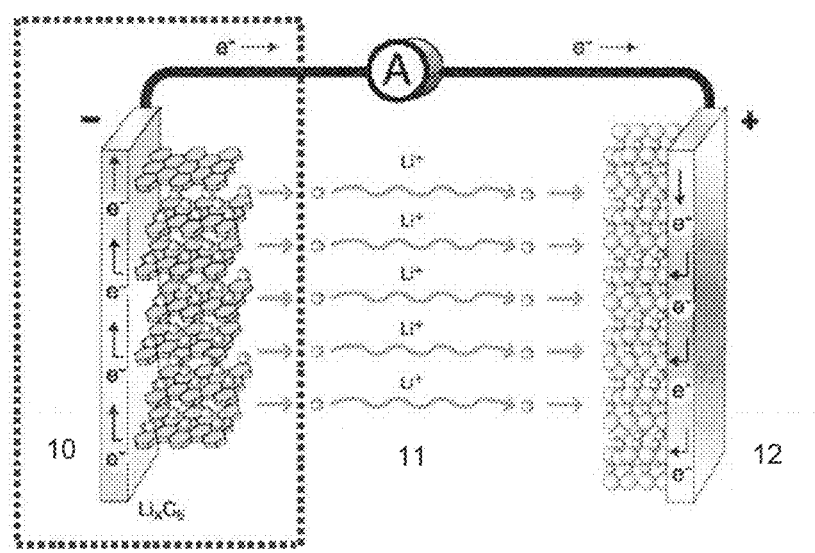
FIG. 1 succinctly describes the operation of a Li-ion battery.

As used herein, the expression "electrode material of the same type as electrode materials used in Li-ion batteries" refers to materials having characteristics that are similar to those of anode and cathode materials used in Li-ion batteries (i.e., a material that reacts as an anode or a cathode material in a Li-ion battery). More specifically, the expression refers to a "cathode material of the same type as cathode materials used in Li-ion batteries" or an "anode material of the same type as anode materials used in Li-ion batteries".

As used herein, the expression "light sensitive dye of the same type as light sensitive dyes used in dye-sensitized solar cells (DSSC)" or the expression "photosensitive dye" refers to dyes having characteristics that are similar to those of dyes used in photo batteries (i.e., a dye that reacts as a dye in a photo battery). More specifically, one or the other of the two expressions refers to a material wherein molecules absorb photons. As such at least one electron of the molecule moves from the highest occupied molecular energy (HOMO) to the lowest unoccupied molecular orbital (LUMO).

As used herein, the expression "semiconductor material" refers to a material having a bandgap below about 4 eV.

The inventors have designed and built an electrode which, when used in a battery, allows for the battery to be charged using light. The electrode according to the invention comprises, in combination, an electrode material of the same type as electrode materials used in Li-ion batteries and a photosensitive dye of the same type as photosensitive dyes used in dye-sensitized solar cells (DSSC). In an embodiment of the invention, the electrode may further comprise a semiconductor material. A battery comprising the electrode according to the invention may be charged using light, instead of an external current.

In an embodiment of the invention, the cathode is obtained by combining a cathode material of the same type as cathode materials used in Li-ion batteries and a light sensitive dye of the same type as light sensitive dyes used in DSSC. In a preferred embodiment, the combination may comprise a semiconductor material.

The cathode material of the same type as cathode materials used in Li-ion batteries may be an olivine type material. In an embodiment of the invention, the cathode material may be LiFePO$_4$, LiCoO$_2$, FeS$_2$ or V$_2$O$_5$. In a preferred embodiment, the cathode material is LiFePO$_4$. The cathode material of the invention may be coated with carbon.

In an embodiment of the invention, the anode is obtained by combining an anode material of the same type as anode materials used in Li-ion batteries and a light sensitive dye of the same type as light sensitive dyes used in DSSC. In a preferred embodiment, the combination may comprise a semiconductor material.

The anode material of the same type as anode materials used in Li-ion batteries may be metallic lithium, graphite, silicon, or a metal oxide such as $Fe_2O_3$, $TiO_2$, $Li_4Ti_5O_{12}$, etc. In a preferred embodiment, the anode material may be metallic lithium or graphite. The anode material according to the invention may be coated with carbon.

The light sensitive dye of the same type as light sensitive dyes used in DSSC may be N3, "black dye", SJW-E1 or N719. In a preferred embodiment of the invention, the light sensitive dye is N719.

The semiconductor material may be $TiO_2$, ZnO, $SnO_2$ or "core-shell". In a preferred embodiment of the invention, the semiconductor material is $TiO_2$.

The three components of the cathode according to the invention, namely, cathode material of the same type as cathode materials used in Li-ion batteries, light sensitive dye of the same type as light sensitive dyes used in DSSC and semiconductor material, are in close contact. In a preferred embodiment, the cathode material and the semiconductor material may first be mixed together then the dye added.

The cathode material used is in the form of submicron particles or in the form of hydrothermally obtained particles. The size of the particles may be below 1 μm. In a preferred embodiment of the invention, the size of the particles is below 0.1 μm.

The semiconductor material used is in the form of nanometric powder. The size of the particles may be below 100 nm. In a preferred embodiment of the invention, the size of the particles is below 30 nm. The semiconductor material may be in the form of a pre-calcined powder.

The dye used may be in liquid form, and in a preferred embodiment, addition of the dye may be performed by dipping into the liquid the film comprising the cathode material and the semiconductor material. In an embodiment of the invention, the film comprises the cathode material but not the semiconductor material.

The mixture, cathode material semiconductor material may further comprise other agents such as solvents (for example water, N-methyl-2-pyrrolidone (NMP), etc.), binders (for example PEG, etc.), dispersants (for example Triton-X100, etc.).

Figure 4:
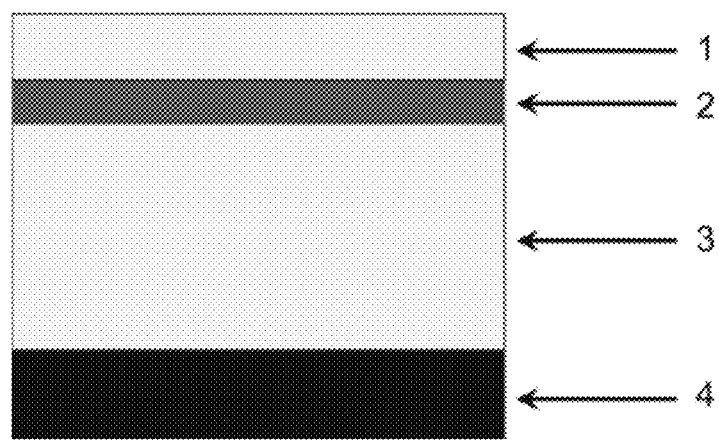
FIG. 4 illustrates an assembly according to the invention.
Figure 5:
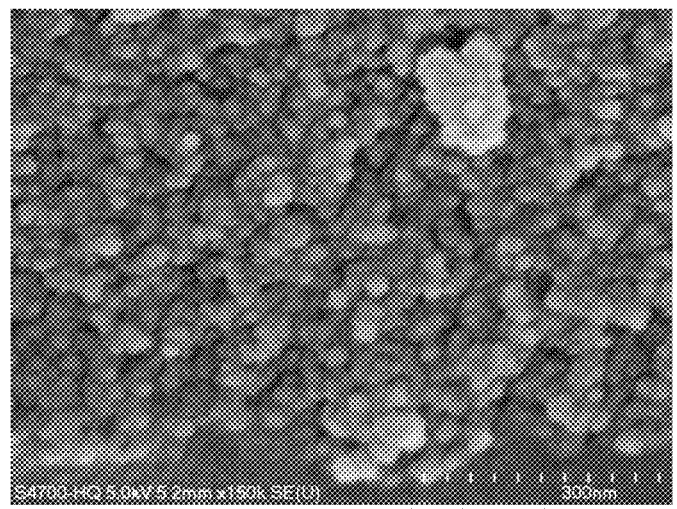
FIG. 5 is a scanning electron micrograph (SEM) of titanium oxide powder pre-calcined at 400° C. (Example 1).

The electrode material (FIG. 4, arrow 2) is deposited on a substrate that is transparent and conductive (FIG. 4, arrow 1). The substrate is both transparent to light and electronically conductive, allowing movement of electrons from or to an external circuit. In this embodiment, the electrolyte (FIG. 4, arrow 3) is lithiated similarly to electrolytes used in Li-ion batteries. Also, the electrolyte contains no sacrificial redox couple. The anode (FIG. 4, arrow 4) is of the same type as anodes used in Li-ion batteries.

Similarly to DSSC, during light exposure, the photosensitive dye is excited and may finally be oxidized, since at least one electron of the molecule moves to the LUMO which is of higher energy than the conduction band of the semiconductor. The semiconductor thus sends electrons towards the external circuit via the current collector. The cathode material of the battery or battery cathode material (BCM) which has been reduced, acts as sacrificial redox couple similarly to sacrificial redox couples in DSSC. Oxidation of the reduced BCM, Li(BCM) is performed according to the following reaction:

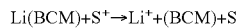

For the reaction to proceed spontaneously, it is necessary that the standard potential of the redox couple of the dye, $S^+/S$ be superior to the standard potential of sacrificial redox couple, $Li^+/Li(BCM)$. Typically in DSSC, the redox couple used is $I_3^-/I^-$ which has a standard potential of 0.53V vs. ESH and which corresponds to 3.57V vs. $Li^+/Li$. Accordingly, any cathode material used in a battery having a standard potential below 3.6V vs. $Li^+/Li$ may be oxidized when the material is combined with a photosensitive dye of the same type as dyes used in DSSC. In this case, the battery cathode material in reduced state, Li(BCM) may be oxidized into BCM replacing the sacrificial redox couple $I^-/I_3^-$ of DSSC. In a case where a cathode material is used in a battery having a standard potential higher than 3.6V vs. $Li^+/Li$, synthesis and/or use of specific dyes, similarly to DSSC using the redox couple $Co^{3+}/Co^{2+}$, may be contemplated.

Lithium ions released following the reaction at the cathode are reduced at the anode by electrons from the external circuit. Accordingly, it is possible to obtain oxidation of the reduced cathode material with no external current.

Example 1

Figure 2:
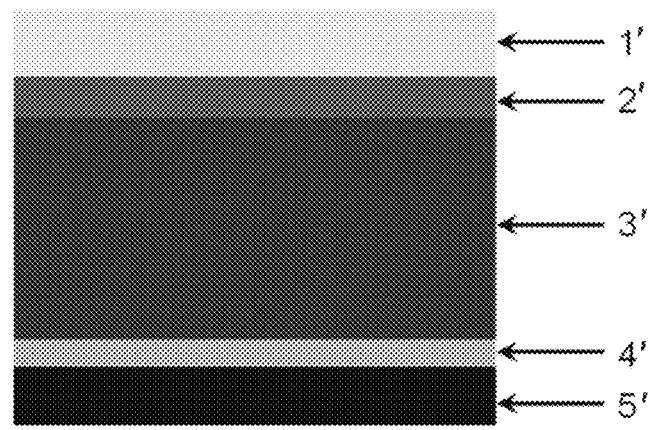
FIG. 2 succinctly outlines a dye-sensitized solar cell (DSSC).
Figure 3:
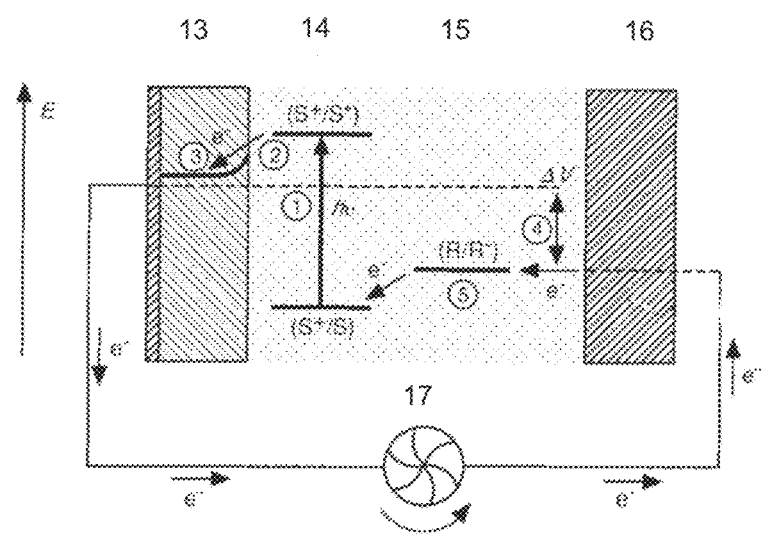
FIG. 3 succinctly outlines the operation of a DSSC.

Composition of the cathode material (paste):
$TiO_2$ in nanomeric powder form and pre-calcined at 400° C./1 h (FIG. 2): 0.3 g
Submicron $LiFePO_4$ particles: 0.3 g
PVDF: 0.06 g
NMP: 3 mL A wet film of the above paste was deposited on a FTO glass substrate (Cytodiagnostics TEC 7, 6-8Ω) by the Doctor Blade method (3 mils). The film was annealed under a nitrogen flux according to the following procedure: the temperature is brought to 400° C. within 1 hour and maintained at 400° C. during 1 hour followed by natural cooling until room temperature is reached.

Figure 6:
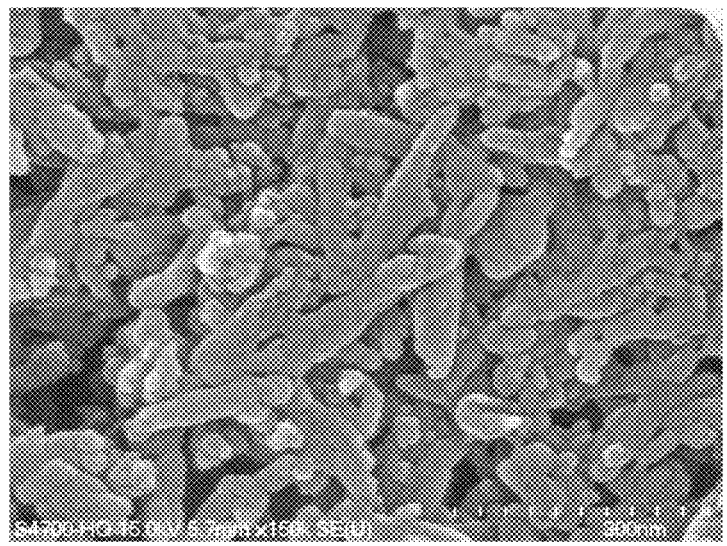
FIG. 6 is a scanning electron micrograph (SEM) of the surface of the electroactive electrode (Example 1).

The film obtained was dipped into an aqueous solution containing photosensitive dye N719 ($4 \times 10^{-4}$M) during 24 hours. Dye was anchored to the surface of the cathode material particles. Samples of the film were dried at 50° C. under vacuum during 48 hours (FIG. 6).

Figure 7:
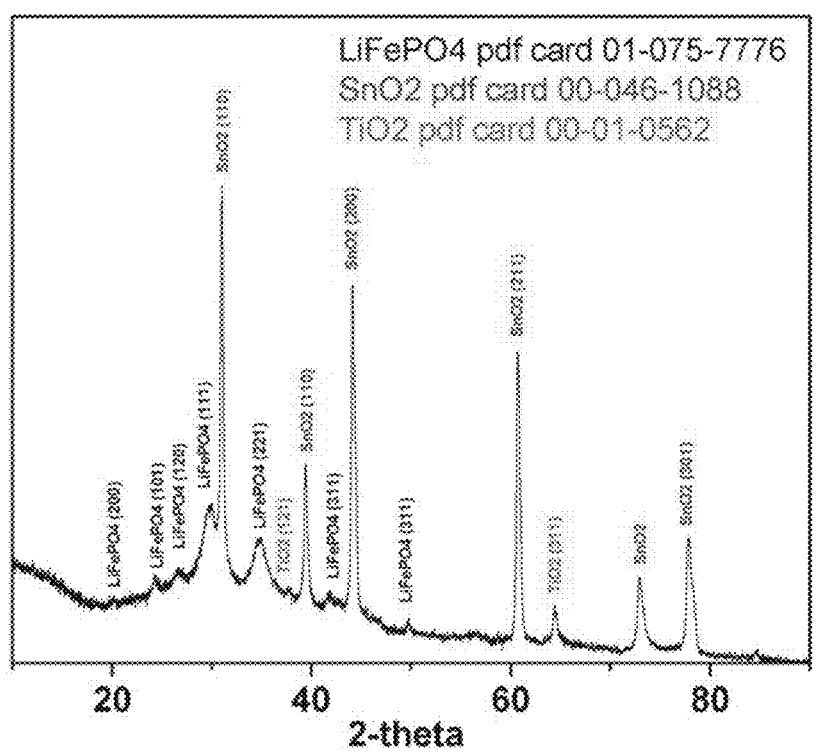
FIG. 7 is an X-ray diffractogram (XRD) of a raw electrode assembly of Example 1.

X-ray diffraction (XRD) diagram of the photoactive raw electrode assembly (FIG. 7) shows the presence of tin oxide from the FTO glass, anatase and brookite phases from titanium oxide, and tryphilite phase from $LiFePO_4$. Peak distribution indicates that no heterosite $FePO_4$ phase is present.

The photoactive electrode was assembled in a three-electrode configuration, in $LiPF_6$ solution (1M) dissolved in EC-DEC-VC as electrolyte vs. Li with a $Li^+/Li$ reference.

Figure 8:
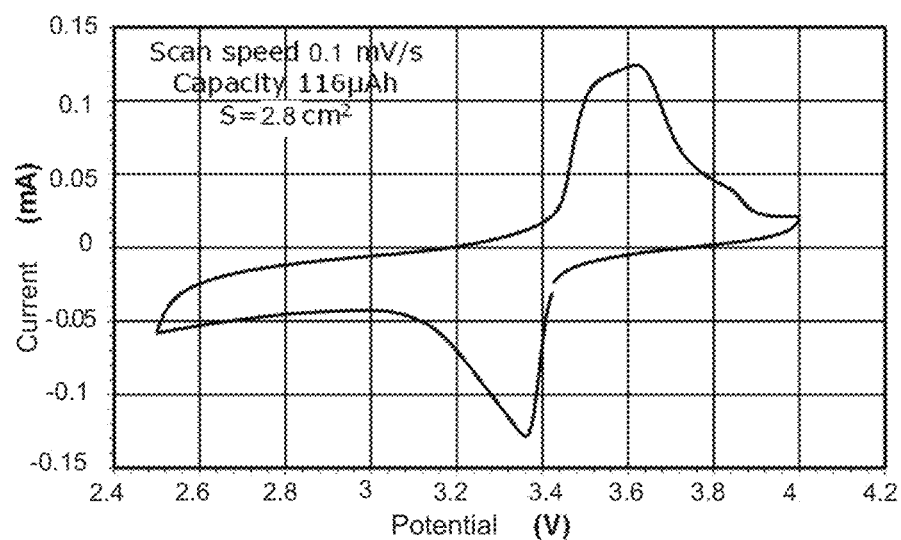
FIG. 8 is a cyclic voltammetry (CV) of an electrode according to Example 1, measured at 0.1 mV/s, 116 μA·h capacity for a surface of 2.7 cm$^2$.

Electrochemical characteristics of these electrodes were measured by cyclic voltammetry (CV) with a scanning speed of 0.1 mV/s and a voltage range from 2.5V to 4V with regard to lithium (FIG. 8). The CV was completed at a potential of 2.5V. The CV obtained is representative of a film consisting of submicron LFP, given its oxidation potential at 3.46V and its reduction potential at 3.4V.

Figure 9:
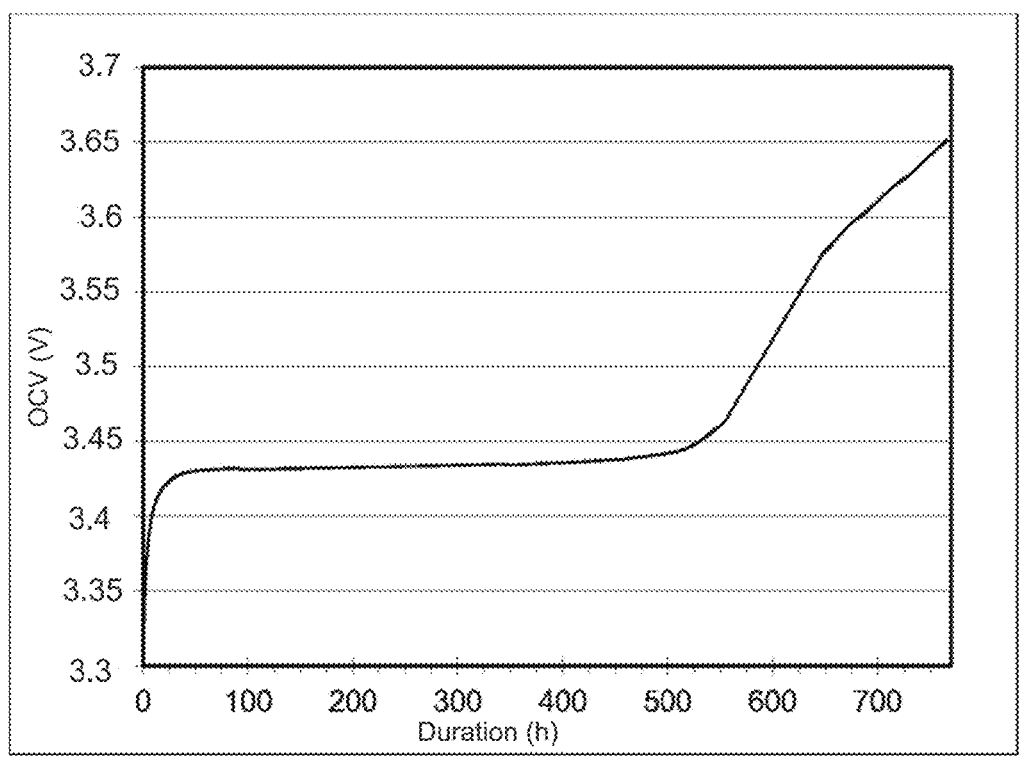
FIG. 9 is an open circuit voltage (OCV) evolution during light exposure of the photo battery according to the invention (Example 1).

The open circuit voltage (OCV) of the sample kept in the three-electrode cell and under the light hood was registered (FIG. 9) once the CV was completed at a 2.5V potential. As expected, a rapid increase of the OCV from 2.5V to 3.4V within 1 hour was obtained. Thereafter, the OCV remained stable during 24 hours at a potential between 3.43V and 3.44V. This stability allowed for the battery to be charged. At the end of the OCV, the voltage of the battery was increased from 3.44V to 3.65V. This increase is due to the charging of the battery or photo battery as expected.

Figure 10:
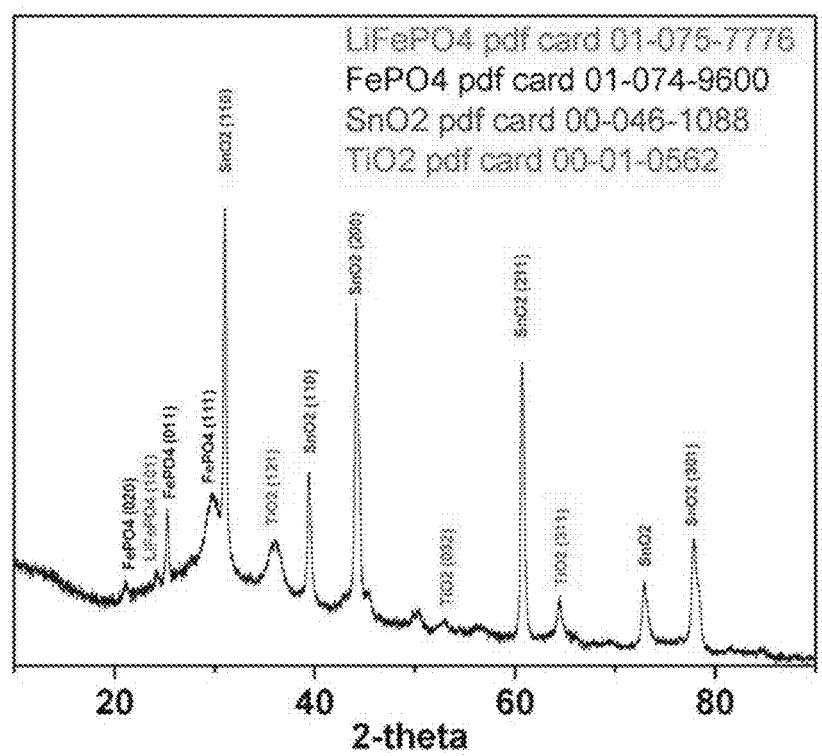
FIG. 10 is an X-ray diffractogram (XRD) of an electrode according to Example 1 after OCV.

After the OCV, the sample was again analyzed by X-ray diffraction (XRD) (FIG. 10). The main peaks correspond to phases observed in FIG. 7, namely, casserite (tin oxide), brookite and anatase. However, some peak changes can be seen in the lower angle region (2θ<30°). These changes are probably due to the fact that part of phosphate lithium iron has been oxidized to phosphate iron. It is not possible to assess from the diffractogram whether all triphilite $LiFePO_4$ was converted to heterosite $FePO_4$, however, the main part was converted.

An estimated mass ratio Fe/Ti at various locations of the film was determined. The ratios were all between 1.49 and 2.02. It should be noted that this ratio is around 0.59 for a homogenous mixture comprising 50-50 mass % $LiFePO_4$—$TiO_2$. The difference is probably due to the fact that $TiO_2$ particles were not well dispersed in the NMP (part of the titanium oxide remained at the bottom of the pot). A lack of titanium oxide may have an impact on the performance of the photo battery. Accordingly, NMP may be replaced by other solvents such as water for example.

Example 2

Composition of the cathode material (paste):
$TiO_2$ in nanomeric powder form and pre-calcined at 400° C./1 h: 0.4 g
Submicron $LiFePO_4$ particles: 0.3 g
PEG as binder: 0.1 g
Water: 2 mL A wet film of the above paste was deposited on a FTO glass substrate (Cytodiagnostics TEC 7, 6-8Ω) by the Doctor Blade method (3 mils). The film was annealed under a nitrogen flux according to the following procedure: the temperature is brought to 400° C. within 1 hour and maintained at 400° C. during 1 hour followed by natural cooling until room temperature is reached.

The film obtained was dipped into an aqueous solution containing photosensitive dye N719 ($4 \times 10^{-4}$M) during 24 hours. Dye was anchored to the surface of the cathode material particles. Samples of the film were dried at 50° C. under vacuum during 24 hours.

Figure 11:
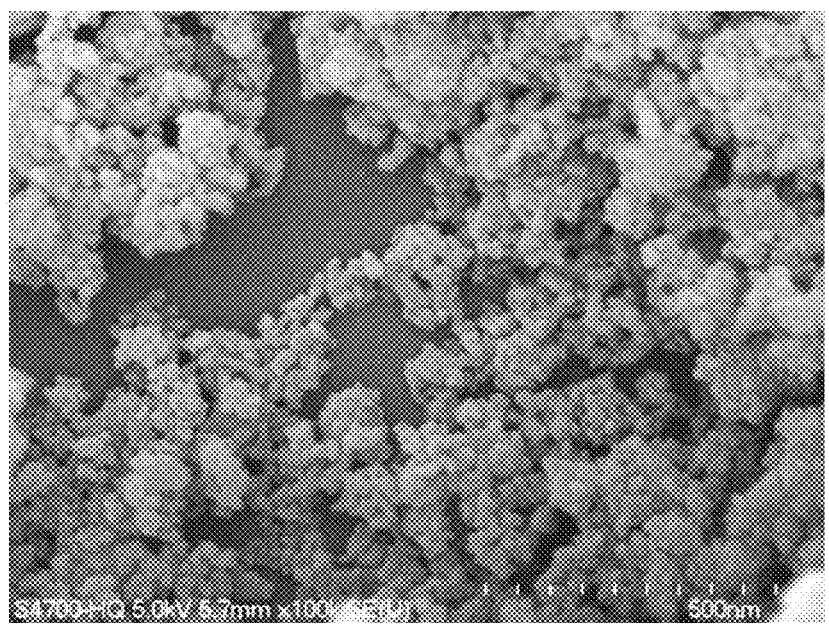
FIG. 11 is a high resolution scanning electron micrograph (HRSEM) of the surface of the film deposited on a fluorine-doped tin oxide glass (FTO glass) after annealing for 1 hour at 400° C. under a flux of nitrogen (Example 2).

High resolution scanning electron microscopy (HRSEM) and energy dispersive spectrometry (EDS) analyses were conducted in order to assess the particles morphology and the mass ratio Fe/Ti. This sample contains no agglomerate having a needle form, contrary to Example 1 (FIG. 11). A mass ratio Fe/Ti of about 0.28 was measured by EDS. It should be noted that the expected mass ratio for this paste was 0.44. This means that the amount of $LiFePO_4$ was lower. Agglomerates having a needle form in Example 1 are probably due to an aggregation of nanomeric $LiFePO_4$ particles.

Figure 12:
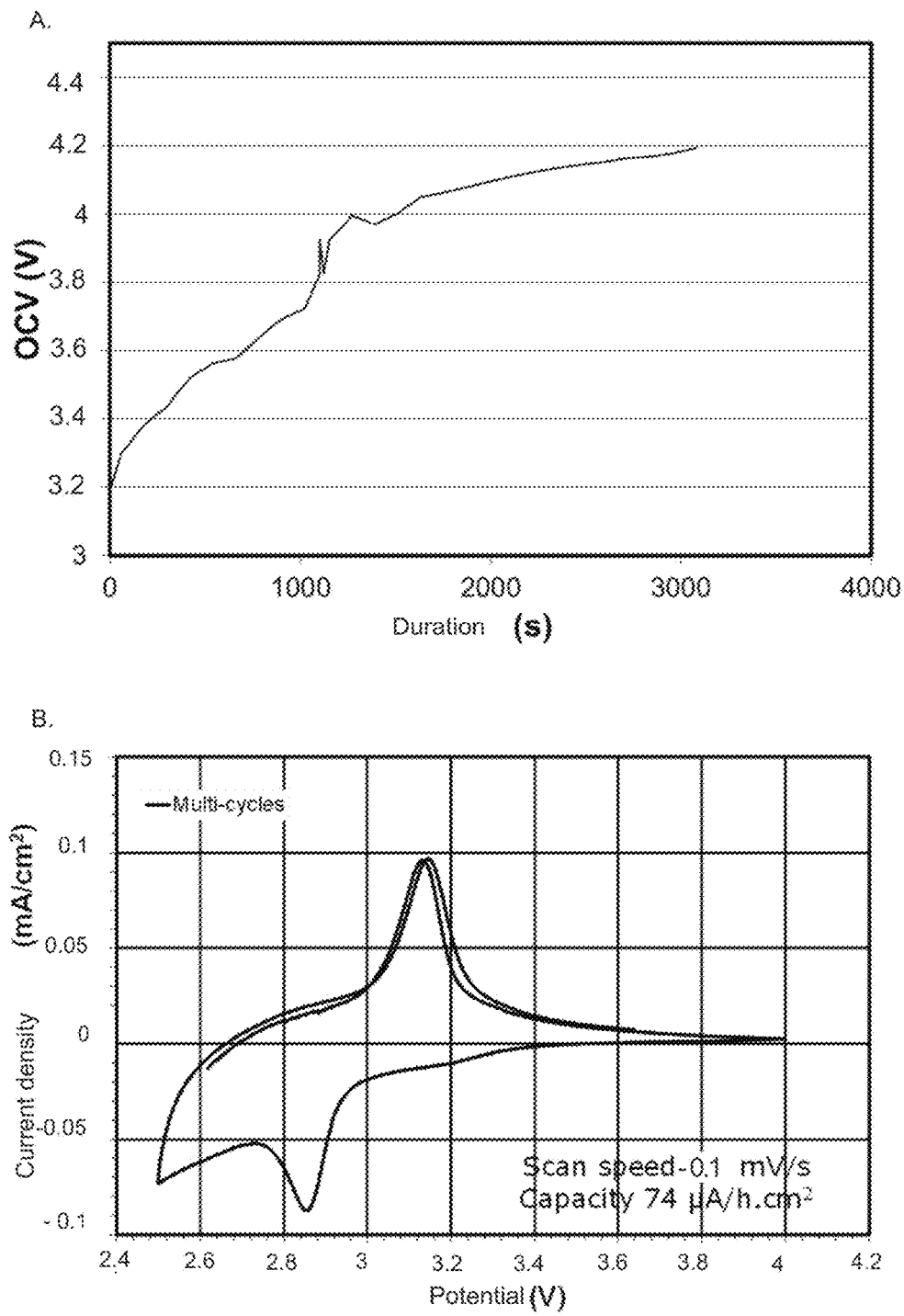
FIG. 12 outlines the electrochemical characterizations for a three-electrode cell of the photoactive electrode according to Example 2 in an electrolyte containing 0.3M LiTFSI in a EC-DEC (30-70 mass %) solution vs. Li, and with a Li$^+$/Li reference: part A of the figure is an OCV evolution during light exposure; and part B is the CV of the film, the potential is achieved with a scanning speed of 0.1 mv/s yielding a capacity of 74 μA·h/cm$^2$ (Example 2).
Figure 13:
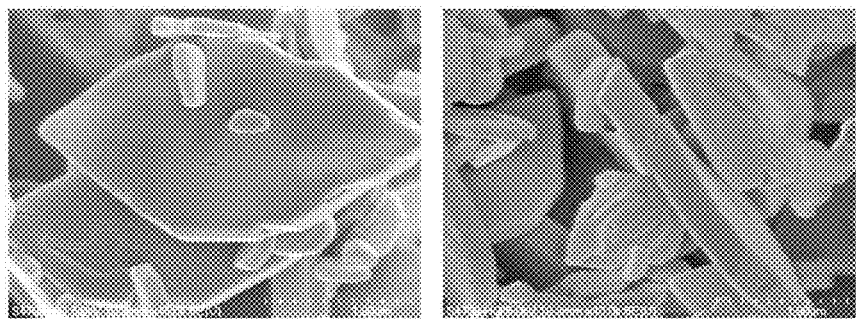
FIG. 13 is a scanning electron micrograph (SEM) of hydrothermally obtained LiFePO$_4$ crystals (Example 3).
Figure 14:
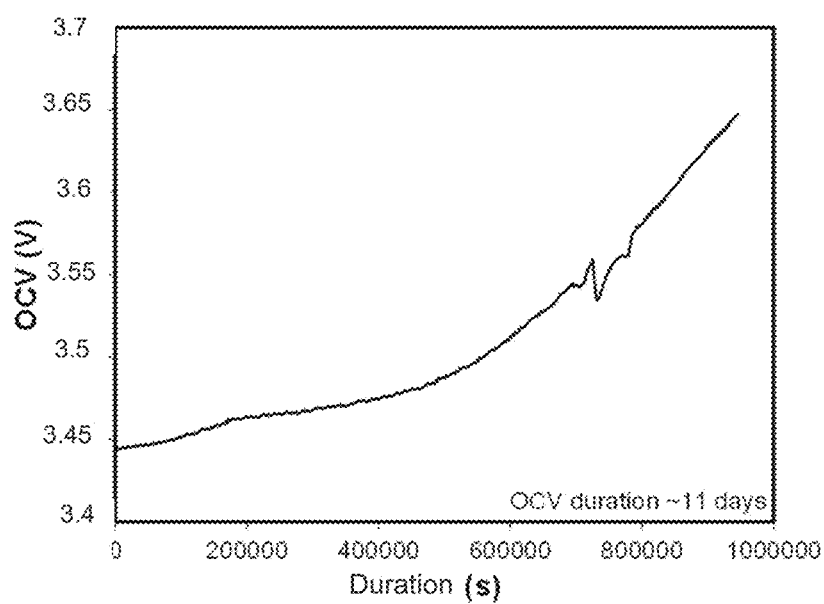
FIG. 14 illustrates the OCV evolution during light exposure of the film assembled as a three-electrode cell using an electrolyte consisting of 1M LiPF$_6$ dissolved in EC-DEC (30-70 mass %) vs. Li, and with a Li$^+$/Li reference, total duration ~11 days (Example 3).

The photo oxidation process was monitored by OCV (FIG. 12) and measured during light exposure. In this case, the photo oxidation is faster than in Example 1, since a 4.2V voltage in less than 1 hour was measured. This improvement is probably due to a better mixture between $LiFePO_4$ and $TiO_2$. In addition, a CV test of the film shows that the film is reduced at a potential between 2.8-3.0V and is oxidized at a potential between 3-3.2V. This is in conformity with the submicron size of the crystals.

Example 3

Composition of the cathode material (paste):
$TiO_2$ in nanomeric powder form and pre-calcined at 400° C./1 h: 5 g
$LiFePO_4$ particles hydrothermally obtained (FIG. 10): 5 g
Triton-X100 as binder: 0.3 mL
Water: 112 mL This paste was deposited on a FTO glass substrate (Cytodiagnostics TEC 7, 6-8Ω) by the method called "immersion withdrawal" or "dipping withdrawing". The film was annealed under a nitrogen flux according to the following procedure: the temperature is brought to 400° C. within 1 hour and maintained at 400° C. during 1 hour followed by natural cooling until room temperature is reached. The film obtained was dipped into an aqueous solution containing photosensitive dye N719 ($4 \times 10^{-4}$M) during 24 hours. Dye was anchored to the surface of the cathode material particles. Samples of the film were dried at 50° C. under vacuum during 24 hours.

OCV of the film during light exposure was then conducted and monitored: an increase of the potential from 3.45V to 3.65V in 11 days was observed. Comparing to Example 2, this photo-oxidation was slower. This is probably due to the fact that $LiFePO_4$ particles of the film are far bigger than the particles in Example 2.

Example 4

Composition of the cathode material (paste):
Submicron $LiFePO_4$ particles: 5 g
Triton-X100 as binder: 0.15 mL
Water: 50 mL This paste was deposited on a FTO glass substrate (Cytodiagnostics TEC 7, 6-8Ω) by the method called "immersion withdrawal" or "dipping withdrawing". The film was annealed under a nitrogen flux according to the following procedure: the temperature is brought to 400° C. within 1 hour and maintained at 400° C. during 1 hour, followed by natural cooling until room temperature is reached. The film obtained was dipped into an aqueous solution containing photosensitive dye N719 ($4 \times 10^{-4}$M) during 24 hours. Dye was anchored to the surface of the cathode material particles. Samples of the film were dried at 50° C. under vacuum during 24 hours.

OCV of the film under light exposure was then conducted and monitored (FIG. 12): an increase of the potential from 3.4V to 3.75V in 21 days was observed.

Figure 15:
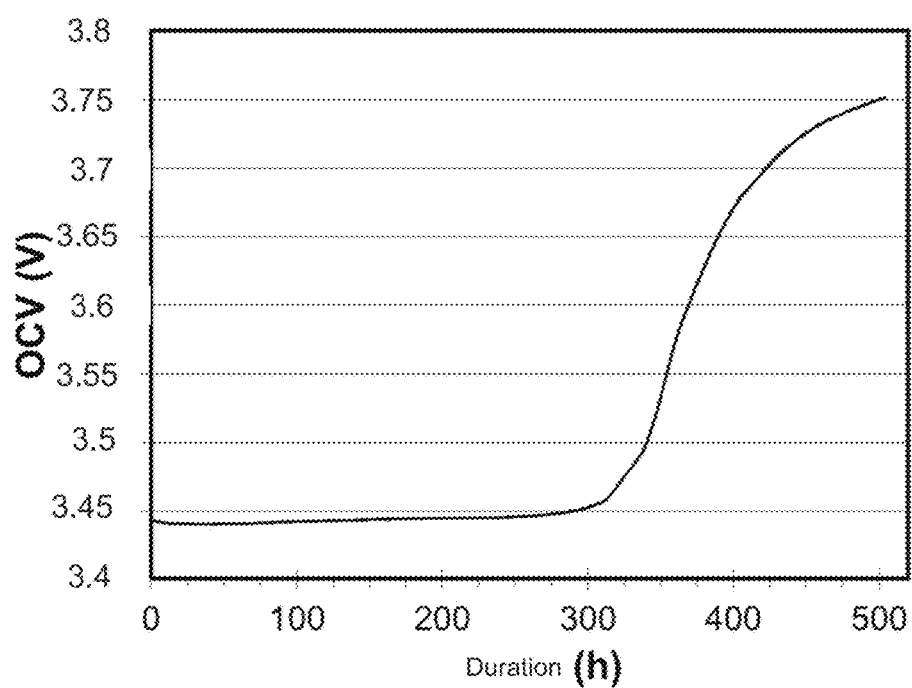
FIG. 15 illustrates measurement of the OCV evolution during light exposure of a film consisting of submicron particles of LFP (lithium ferrophosphate or lithium iron phosphate (LiFePO$_4$)) and N719 dye. The film was assembled as a three-electrode cell in LiPF$_6$ (1M) dissolved in EC-DEC (30-70 mass %) vs. Li, and using a LOU reference (Example 4).
Figure 16:
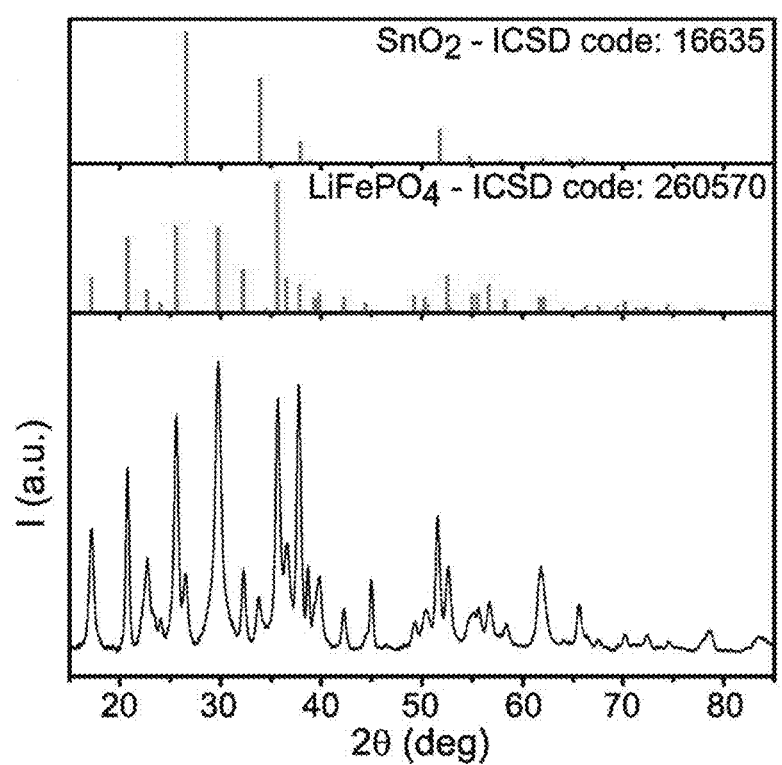
FIG. 16 is an X-ray diffractogram by grazing incident angle of Example 4, before OCV.
Figure 17:
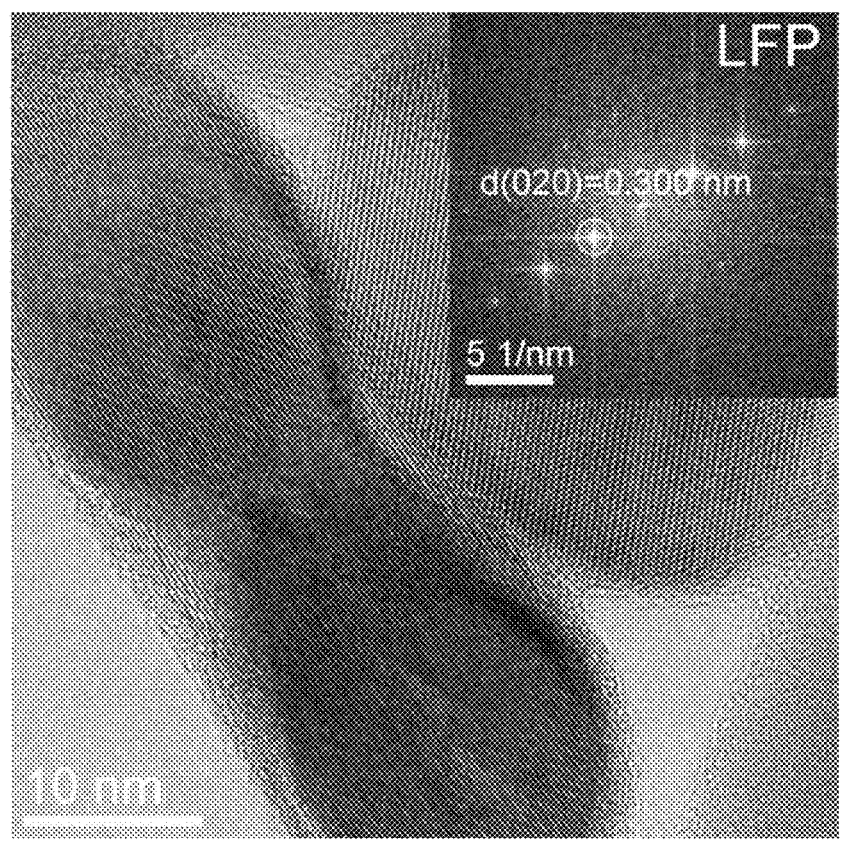
FIG. 17 is a high resolution transmission electron micrograph (HRTEM) of Example 4 before OCV. The inclusion is the Fourrier transformation of the image which proves that LiFePO$_4$ (LFP) of tryphilite structure was initially present.
Figure 18:
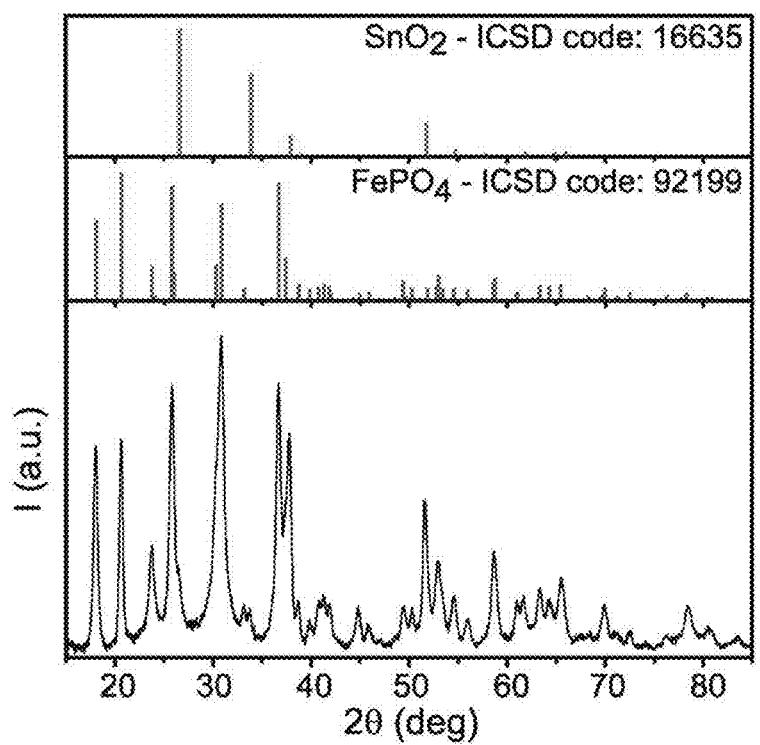
FIG. 18 is an X-ray microgram by grazing incident angle of Example 4, after OCV.
Figure 19:
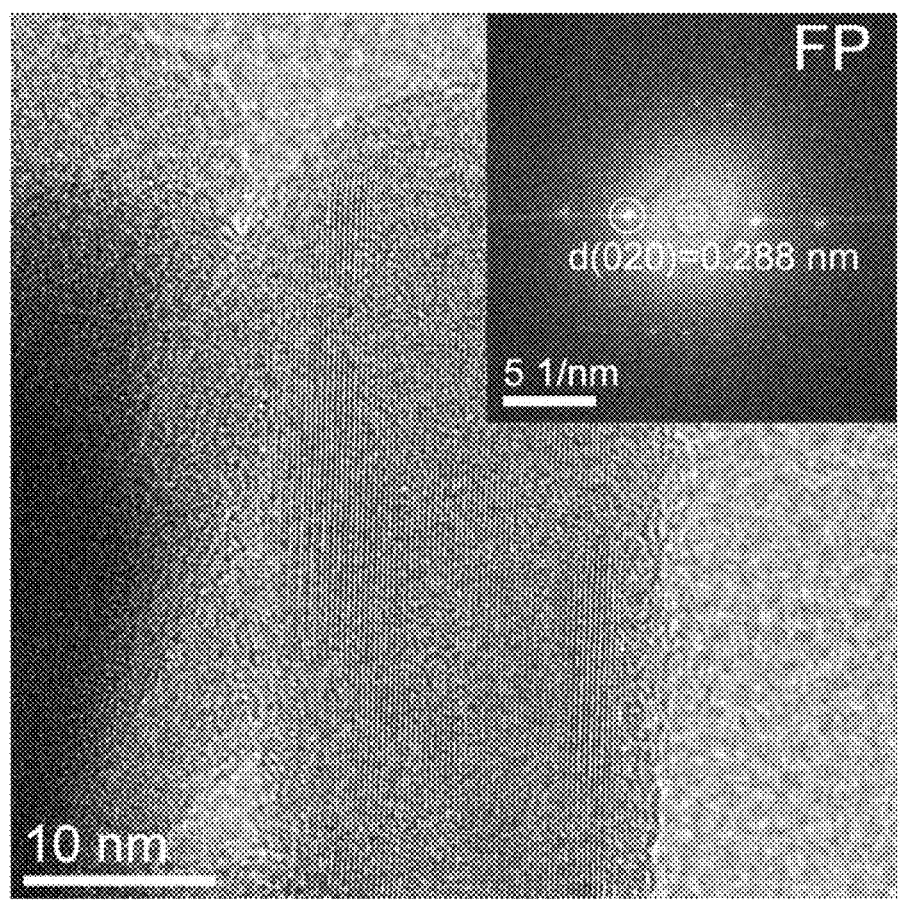
FIG. 19 is a high resolution transmission electron micrograph (HRTEM) of Example 4, after OCV. The inclusion is the Fourrier transformation of the image which proves that FePO$_4$ (LFP) of heterosite structure is formed after light exposure.

FIG. 16 and FIG. 17 are, respectively, X-ray diffractogram (XRD) and high resolution transmission electron micrographs (HRTEM) performed prior to photo-oxidation of the film. It can be seen from these figures that before photo-oxidation, the electrode material consists exclusively of $LiFePO_4$ crystals having triphilite structure. Conversion of triphilite $LiFePO_4$ to heterosite $FePO_4$ obtained by photo-oxidation of the film due to the presence of the photosensitive dye can be seen on the XRD diffractogram and the HRTEM micrographs in FIG. 15 and FIG. 16.

Figure 20:
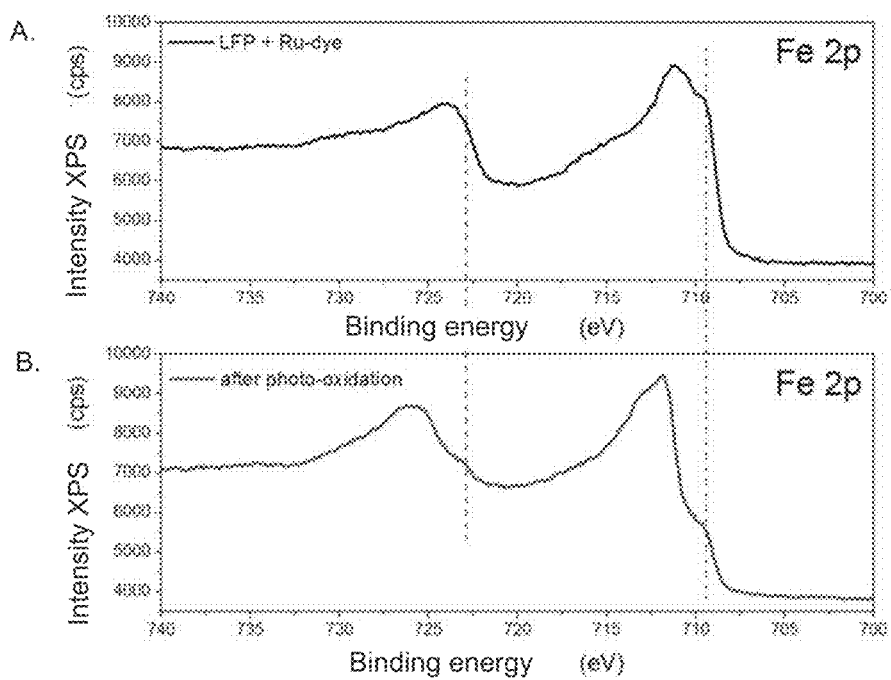
FIG. 20 is an X-ray photoelectron spectroscopy (XPS) spectrum of Example 5, before OCV (part A of the figure) and after OCV (part B of the figure).

FIG. 20 represents XPS measurements performed before (A) and after (B) photo-oxidation. A peak increase for $Fe^{3+}$ species is observed after photo-oxidation. This is in conformity with the conversion of the $LiFePO_4$ triphilite phase to heterosite $FePO_4$. This transformation of $Fe^{2+}$ from $LiFePO_4$ into $Fe^{3+}$ of $FePO_4$ may be monitored by the strong reduction of peaks located at ~709 and ~723 eV both due to $Fe^{2+}$ species and the increase of peaks located at ~712 and ~723 eV due to $Fe^{3+}$ species.

The characterization methods in this example show that photo-oxidation of $LiFePO_4$ to $FePO_4$ is possible with no addition of a semiconductor such as $TiO_2$. However, it appears that use of a semiconductor allows for an increase of the rate of the photo-oxidation.

Example 5

Composition of the cathode material (paste):
Submicron LiFePO$_4$ particles: 5 g
Triton-X100 as binder: 0.15 mL
Water: 50 mL This paste was deposited on a FTO glass substrate (Cytodiagnostics TEC 7, 6-8Ω) by the method called "immersion withdrawal" or "dipping withdrawing". The film was annealed under a nitrogen flux according to the following procedure: the temperature is brought to 400° C. within 1 hour and maintained at 400° C. during 1 hour followed by natural cooling until room temperature is reached. The film obtained was dipped into an aqueous solution containing photosensitive dye N719 ($4\times10^{-4}$M) during 24 hours. Dye was anchored to the surface of the cathode material particles. Samples of the film were dried at 50° C. under vacuum during 24 hours.

Figure 21:
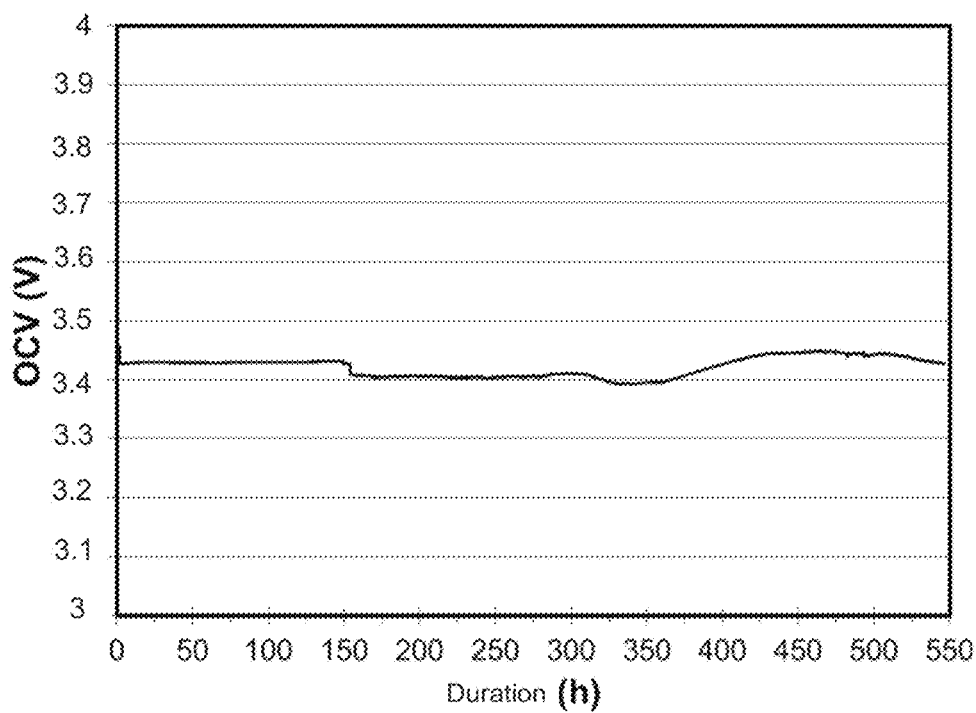
FIG. 21 is a measurement of the OCV evolution of a film consisting of submicron LFP particles and N719 dye. The film was kept in the dark and assembled as a three-electrode cell in LiPF$_6$ (1M) dissolved in EC-DEC (30-70 mass %) vs. Li, and using a Li$^+$/Li reference (Example 5).

The film was kept in the dark during OCV measurement. After 23 days, the potential reached a plateau at 3.4V vs. Li$^+$/Li (FIG. 21). Contrary to Example 4, no increase of the potential was observed. This example shows the requirement of photosensitive dye to be present in order to remove lithium from LiFePO$_4$. Also, it appears that light is required.

Example 6

Composition of the cathode material (paste):
TiO$_2$ in nanomeric powder form and pre-calcined at 400° C./1 h: 5 g
Submicron LiFePO$_4$ particles: 5 g
Triton-X100 as binder: 0.3 mL
Water: 112 mL This paste was deposited on a FTO glass substrate (Cytodiagnostics TEC 7, 6-8Ω) by the method called "immersion withdrawal" or "dipping withdrawing". The film was annealed under a nitrogen flux according to the following procedure: the temperature is brought to 400° C. within 1 hour and maintained at 400° C. during 1 hour followed by natural cooling until room temperature is reached. The film obtained was dipped into an aqueous solution containing photosensitive dye N719 ($4\times10^{-4}$M) during 24 hours. Dye was anchored to the surface of the cathode material particles. Samples of the film were dried at 50° C. under vacuum during 24 hours.

Figure 22:
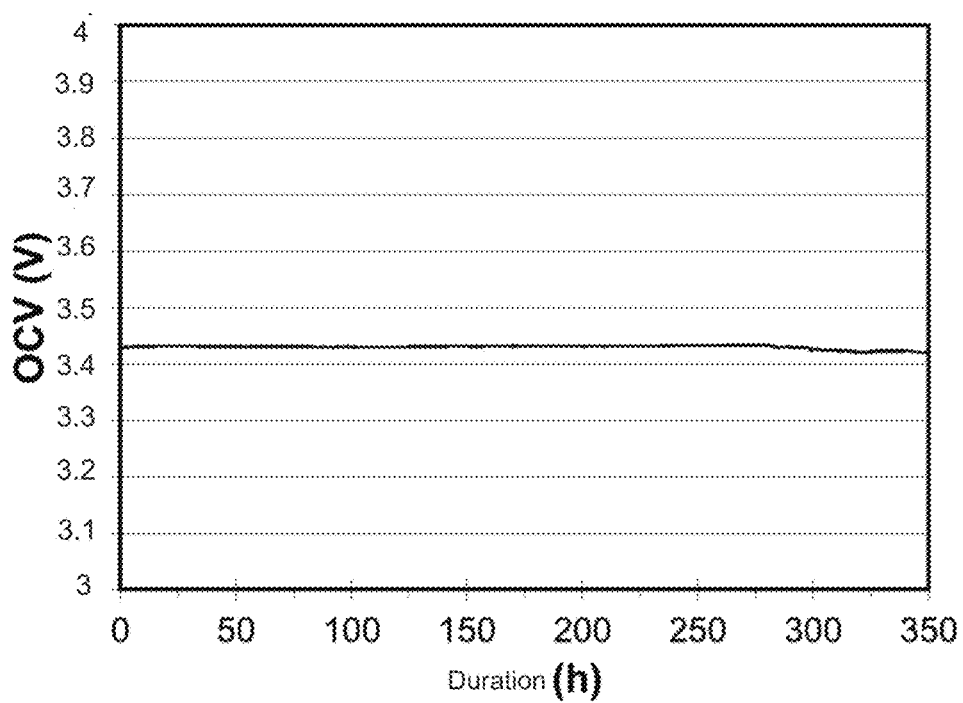
FIG. 22 is a measurement of the OCV evolution of a film consisting of TiO$_2$-LFP and N719 dye. The film was kept in the dark and assembled as a three electrode cell in LiPF$_6$ (1M) dissolved in EC-DEC (30-70 mass %) vs. Li, and using a Li$^+$/Li reference (Example 6).

The film was kept in the dark during OCV measurement. Contrary to Example 2 wherein the system reached a potential of 4.2V in less than 1 hour, the potential reached a plateau of 3.4V with no increase for 14 days (FIG. 22). This example shows that despite the presence of a semiconductor used to improve the removal of lithium in LiFePO$_4$, light was required for the reaction to take place.

Although the present invention has been described hereinabove by way of specific embodiments thereof, it may be modified, without departing from the spirit and nature of the subject invention as defined in the appended claims.

The present description refers to a number of documents, the content of which is herein incorporated by reference in their entirety.

REFERENCES

B. O'Reagan and M. Grätzel, *Nature* (1991) 353, 737-740.

The invention claimed is:

1. Electrode comprising an electrode material that acts as a cathode in Li-ion batteries and a photosensitive dye in contact with a surface of the electrode material, the electrode material comprising an olivine type material selected from LiFePO$_4$, LiCOO$_2$, FeS$_2$ and V$_2$O$_5$.

2. Electrode according to claim 1, further comprising a semiconductor material.

3. Electrode according to claim 2, wherein the semiconductor material is TiO$_2$, ZnO, SnO$_2$, or a combination thereof.

4. Electrode according to claim 2, wherein the semiconductor material comprises particles having a size below 100 nm.

5. Electrode according to claim 2, wherein the semiconductor material is pre-calcined.

6. Electrode material according to claim 2, wherein the photosensitive dye is anchored to the surface of particles of the electrode material and particles of the semiconductor material.

7. Electrode according to claim 1, wherein the electrode material is coated with carbon.

8. Electrode according to claim 1, wherein the electrode material comprises particles having a size below 1 µm.

9. Electrode according to claim 1, wherein the photosensitive dye is N3, black dye, SJW-E1, N719, an organic photosensitive dye, or a combination thereof.

10. Electrode according to claim 1, further comprising a solvent, a dispersant, a binder, or a combination thereof.

11. Electrode according to claim 10, wherein:
the solvent is N-methyl-2-pyrrolidine (NMP), water, acetone, dimethylformamide (DMF), dimethyl sulfoxide (DMSO), or a combination thereof and/or
the dispersant is polyvinylidene difluoride (PVDF), a tension-active agent that does not react with electrode materials, an alkyl bromide ammonium salt, an alkylbenzyldimethylammonium halide, a glycol ester, a glycerol ester, or a combination thereof; and/or
the binder is polyethylene glycol (PEG), polyvinylidene difluoride (PVDF), polyvinyl acetate (PVA) or a combination thereof.

12. Electrode material according to 1, wherein the photosensitive dye is anchored to the surface of particles of the electrode material.

13. Solid substrate having deposited thereon a material as defined in claim 1; optionally the solid subtract is a fluorine-doped tin oxide glass (FTO glass).

14. Battery comprising an electrode as defined in claim 1.

15. Battery according to claim 14, which is rechargeable using light.

16. Electrode comprising an electrode material that acts as an anode in Li-ion batteries and a photosensitive dye in contact with a surface of the electrode material, the electrode material comprising metallic lithium, graphite, silicon, Fe$_2$O$_3$ or Li$_4$Ti$_5$O$_{12}$.

17. Method of manufacturing an electrode configured to be used in a lithium-ion battery, comprising the following steps:
(a) preparing a film comprising an electrode material which reacts as an anode or a cathode when used in Li-ion batteries; and
(b) bringing into contact the film and a solution comprising a photosensitive dye, wherein the photosensitive dye is anchored to the surface of particles of the electrode material, further comprising a preliminary step of (a1) mixing the electrode material with a semiconductor material prior to conducting step (a).

18. Method according to claim 17, wherein step (a) comprises depositing the mixture electrode material and semiconductor material on a solid substrate; optionally the solid substrate is a fluorine-doped tin oxide glass (FTO glass).

19. Method according to claim 17, wherein step (a) comprises depositing the electrode material on a solid substrate, optionally the solid substrate is a fluorine-doped tin oxide glass (FTO glass).

20. Method according to claim 19, wherein depositing of the material is carried out by a Doctor Blade method, by an immersion withdrawal or dipping withdrawing method, by a serigraphy method, by a spin-coating method, or by a combination thereof.

21. Method according to claim 17, wherein step (a) comprises using a solvent; and the method further comprises, between steps (a) and (b), a drying step followed by a cooling step; optionally the drying step is carried out at a temperature of about 400° C. and under an inert atmosphere, and cooling is carried out until room temperature is reached.

22. Method according to claim 17, wherein step (b) comprises dipping the film into the solution comprising a photosensitive dye.

23. Method according to claim 17, further comprising a drying step after step (b) followed a cooling step; optionally the drying step is carried out at a temperature between room temperature and 120° C. and under an inert atmosphere; and cooling is carried out until room temperature is reached.

\* \* \* \* \*